Jan. 7, 1958 D. B. DAWKINS 2,818,594
AUTOMOBILE FOOT SCRAPER
Filed July 13, 1955 2 Sheets-Sheet 1
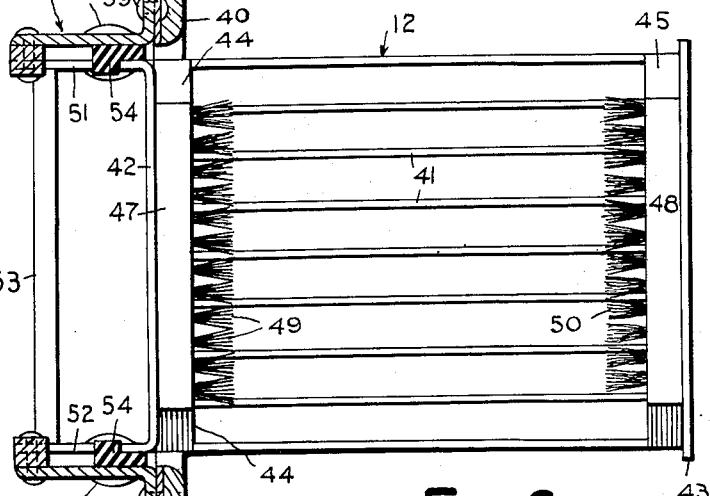
Fig. 5.
Fig. 7.
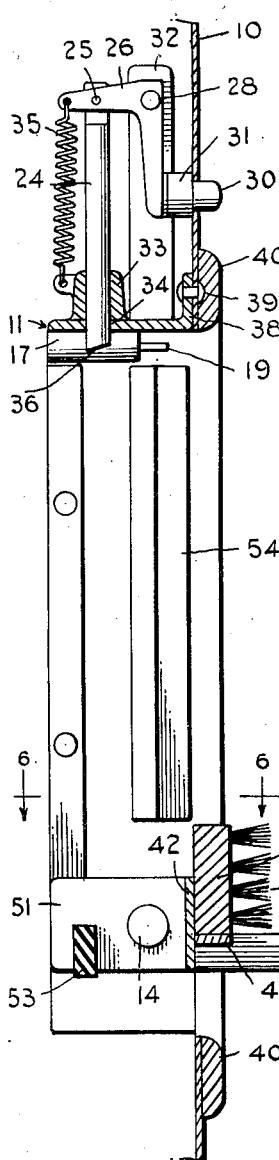
Fig. 6.
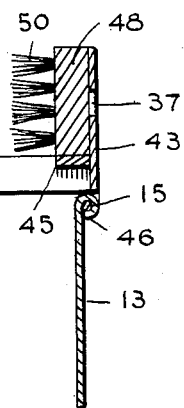
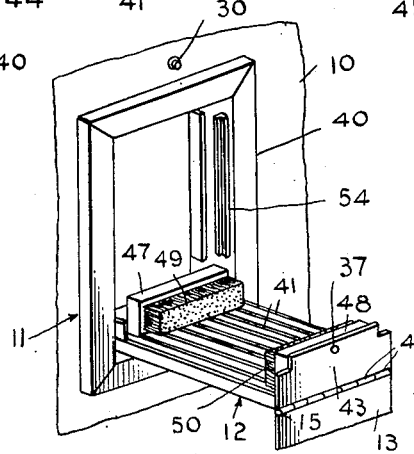
Fig. 1.
*INVENTOR*
DURHAM B. DAWKINS
*ATTORNEYS*

Jan. 7, 1958 D. B. DAWKINS 2,818,594
AUTOMOBILE FOOT SCRAPER
Filed July 13, 1955 2 Sheets-Sheet 2
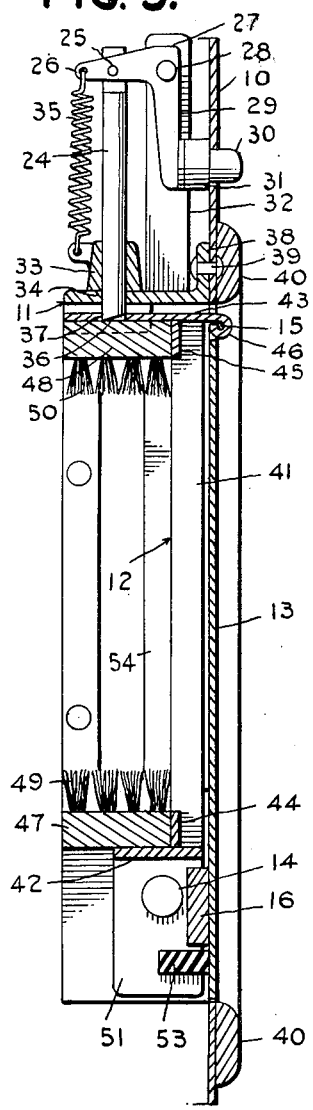
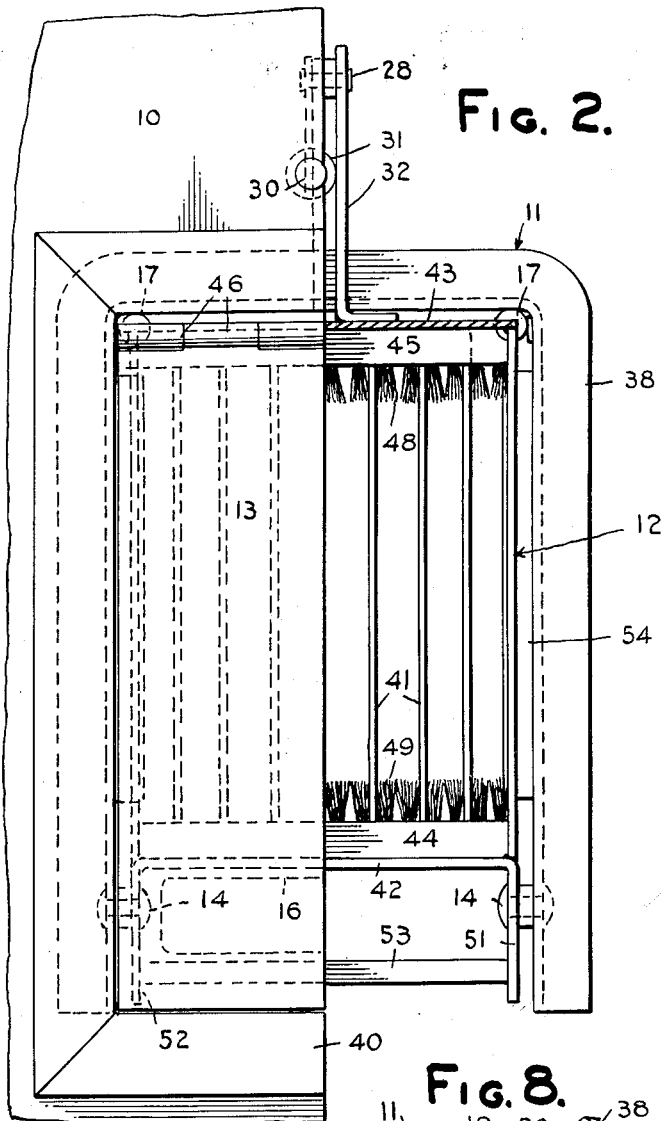
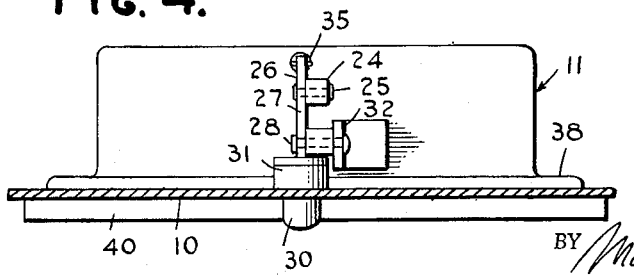
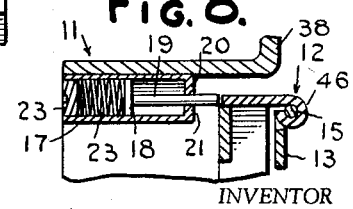
INVENTOR
DURHAM B. DAWKINS
BY
ATTORNEYS United States Patent Office 2,818,594
Patented Jan. 7, 1958

2,818,594

AUTOMOBILE FOOT SCRAPER

Durham Boykin Dawkins, Alexandria, Va.

Application July 13, 1955, Serial No. 521,723

4 Claims. (Cl. 15—237)

The present invention relates to automobile foot scraper and has for an object to provide an accessory device adapted to be mounted upon an automobile, as for instance upon the inside of a door of such automobile, which will be normally in an inconspicuous folded or stowed position substantially flush with the inside upholstery of the automobile door, and which may be readily and quickly projected to an operative position where it will offer means for scraping mud or other adherent foreign matter from the soles of shoes and at the same time bushing the uppers of the shoes of a person preparatory to entering the vehicle whereby such foreign matter will not be tracked into the interior of the automobile.

Another object of the invention is to provide an automobile foot scraper constituting a separate article of commerce which may be manufactured and assembled quite independently of the vehicle and may be sold separately therefrom, if desired and later installed by a relatively simple modification of the door structure of the automobile.

A further object of the invention is to provide an automobile foot scraper in which a relatively simple form of frame is so constructed and arranged that it may be readily let into a vehicle door construction and blend inconspicuously with the upholstery upon the inside of the door so that the entire device is flush with the door and constitutes a foot scraping and brushing platform movably mounted in the frame which is only exposed for use when such platform is folded out of the frame which may, if desired, be automatically projected by a spring or other release device when a latch is released under the control of the passenger or driver of the vehicle.

A further object of the invention is to provide an automobile foot scraper in which a cover is so movably mounted upon the scraping and brushing platform that in the infolded position of the platform within the frame the cover will automatically seek a closed position closing the frame and obscuring the platform.

A still further object of the invention is to provide an automobile foot scraper in which the act of closing the device places under tension a release or projection means by which the scraper is automatically projected to an open operative position whenever a latch device is released.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a fragmentary perspective view of a vehicle door upholstery showing the foot scraper according to the invention installed flush therein and with the foot scraping and bushing device and the cover shown in the projected operative position.

Fig. 2 is a front elevational view, with parts broken away and parts shown in section of the improved device taken on a much magnified scale and with the parts shown in the closed position.

Figure 3 is a vertical transverse sectional view taken through the device in the closed position thereof and illustrating a form of latch device that may be used to maintain the platform and the cover in the closed position within the frame.

Figure 4 is a top plan view of the device with a portion of the upholstery shown in section and illustrating more particularly the latch and release button.

Figure 5 is a vertical transverse sectional view similar to Figure 3 but showing the scraping and brushing platform and the cover in the lowered projected operative position.

Figure 6 is a horizontal sectional view taken on the line 6—6 of Figure 5.

Figure 7 is a top plan view of the device with parts broken away and parts shown in section and illustrating more particularly the projection or release devices and a preferred method of affixing the upholstery of the vehicle door about the frame of the improved foot scraper.

Figure 8 is a transverse sectional view taken through one of the release or projection devices showing the relation of the foot scraping and brushing platform thereto in the closing position of the platform.

Referring more particularly to the drawings 10 designates the upholstery to be found customarily upon the interior surfaces of the doors of automobiles, and 11 represents a frame for carrying the foot scraper of the present invention, which frame 11, as shown in Figure 1, is let into the door construction and flush with the upholstery 10. A shoe cleaning platform 12 is also shown in this Figure 1 as projecting outwardly from the lower portion of the frame 11 and a cover 13 is shown as depending from the outer portion of the shoe cleaning platform 12.

As shown more particularly in Figures 2, 3 and 5 the inner lower portion of the platform 12 is rockingly mounted in the frame 11 upon pivots 14 while the cover 13 is pivotally connected to the outer lower portion of the platform 12 as by a hinge pintle 15.

Referring more particularly to Figure 3 a cover weight 16 is secured to the inner lower portion of the cover 13 to cause the cover 13 to normally seek a substantially vertical position which it is enabled to do by virtue of the hinge pintle 15 connection with the upper or outer portion of the platform 12.

Referring more particularly to Figures 2, 5, 7 and 8, ejection or release devices are carried by the frame 11 in position to be encountered by the platform 12 when moved to a closed position whereby these release or ejection devices are placed in a potential position or under tension so that they may subsequently act to apply thrust to the upper portions of the platform 12 in a direction to rotate the platform about the pivots 14 down to the substantially horizontal open position of Figures 1 and 5.

In Figures 2 and 7 these ejection or release devices are shown to be two in number. Figure 8 shows more particularly a preferred construction of such release or ejection device in which 17 designates a casing affixed to the underside of the top portion of the frame 11 having a plunger 18 slidably mounted therein with a plunger rod 19 projecting forwardly therefrom and through a bearing aperture 20 in the front wall 21 of the casing 17. The outer forward end of the plunger rod 19 is directly in the path of an upper portion of the platform 12 in its closing movement. A coil spring 22 is mounted in the casing 17 in back of the plunger 18, the coil spring 22 being introduced through the rear end of the casing 17 which is later closed by a plug 23 or an adjusting nut.

Referring more particularly to Figures 2, 3, 4 and 5, a form of latch device is illustrated for holding the platform 12 in the closed position within the frame 11 against the action of the ejection or release devices 17. In these figures a latch bolt 24 is shown as being connected by a pivot 25 at its upper end to the horizontal arm 26 of a bell crank lever 27. This bell crank lever is mounted upon a pivot 28 and its vertical arm 29 at a point remote from the pivot 28 is disposed back of a release button 30, which is slidably mounted in a collar 31. Both the bell crank lever 27 and the collar support 31 may be mounted upon a support 32 carried by the door construction.

A hollow bearing boss 33 upstanding from the upper portion of the frame 11 is adapted to slidably receive the lower portion of the latch bolt 24. The lower end of the latch bolt 24 also slides through an aperture 34 in the upper portion of the frame 11 and the terminal lower end of the latch bolt 24 is beveled as shown at 36 to be encountered by the platform 12 as it moves to closing position for automatically lifting the latch bolt 24 out of the path of the platform 12 until an aperture 37 of the platform 12 arrives in registry with the latch bolt 24, as shown in Figure 3, in which position a coil spring 35 projects latch bolt 24 downwardly and into the aperture 37 so as to lock the platform 12 in place. This coil spring 35 may be connected between the horizontal arm 26 of the bell crank lever 27 at its upper end and the bearing boss 33 at its lower end or to some other part of the frame 11.

The frame 11 may be provided with out-turned flanges 38 at its forward edges against which the upholstery 10 is fitted and rivets 39 or other fastenings may be employed to hold the upholstery 10 to these flanges 38. Trim or molding or a garnish mold 40 may be applied over the rivets 39 all around the frame 11 to impart a finish and neat appearance and to obscure the rivets 39.

The platform 12 may be constructed in any desired manner. A preferred form comprises a number of scraper blades 41 which are placed vertically on edge and spaced apart to provide slots therebetween passing completely through the platform.

These scraper blades 41 are connected at their ends to inner and outer end walls 42 and 43 of the platform 12. Where the blades 41 and end walls 42 and 43 are of metal these parts may be welded together. The same may also be welded to the cross bars 44 and 45, shown more particularly in Figures 3 and 5. These cross bars constitute reinforcing and strengthening elements and tend to tie the scraper blades 41 together into a unitary rigid construction. The lower portion of the outer wall 43, as shown more particularly in Figures 1 and 5 and the upper portion of the cover 13 are provided with interleaved rolled tongues 46 for receiving the pintle 15 therethrough so as to hingedly support the cover 13 from the outer wall 43 of the platform 12.

Brush heads 47 and 48 may be seated along their edges upon the cross bars 44, 45 and with their backs against the end walls 42, 43 of the platform 12 so that the bristles 49 and 50 project inwardly toward one another across the space of the scraper blades 41. The brush heads 47 and 48 may be connected to the cross bars 44, 45 or to the end walls 42, 43, or to both.

As shown more particularly in Figures 2 and 6 and to some extent in Figures 3 and 5, flanges 51 and 52 are turned rearwardly from the inner end wall 42 of the platform 12 and in the embodiment of the invention illustrated in the drawings, it is these flanges 51, 52 that are mounted upon the pivots 14 carried by the frame 11 and by which the platform 12 is enabled to swing upwardly and downwardly between the two positions of Figures 3 and 5. At the inner lower sides of the pivots 14 these flanges 51, 52 carry a cover stop 53, which in the position of Figure 3 lies in the path of the lower portion of the cover 13 so that when the cover 13 is automatically swung by its weight 16 into the vertical position of Figure 3 it will impinge against this cover stop 53 which may be made of rubber or other suitable cushion material.

As shown more particularly in Figures 1 and 6, platform stops and silencers 54 are mounted in opposite sides of the vertical portions of the frame 11. These members are preferably of rubber and in the form of elongated vertical strips which are shouldered so that the same may receive thereagainst the end scraper bars 41 of the platform 12 in the erect closed position of the platform 12. The sides of these rubber strips 54 may also receive the sides of the end scraper bars 41.

In the use of the device, in the closed position of the parts as shown in Figures 2 and 3, the driver or any other passenger of the automobile in opening the door may simply depress the button 30 inwardly which will act to rock the bell crank lever 27 about its pivot 28 thus raising the inner horizontal arm 26 and distending the spring 35 with an accompanying lifting motion of the latch bolt 24. As soon as the lower end of the latch bolt 24 clears the aperture 37 in the upper portion 43 of the platform, the ejector or release springs 22, which have been previously compressed by the closing movement of the platform, will be released to an expanding action which will drive out the plungers 18 and the plunger rods 19, the latter of which bear directly against upper portions of the platform 12. Consequently the platform will be projected outwardly of the frame 11 to a point where it will drop down of its own weight by gravity to the horizontal operative position of Figures 5 and 6 and also of Figure 1. In doing so the cover 13 will swing outwardly to the positions of Figures 1 and 5. Or the ejector springs 22 may be of such strength as only to project the upper portion of the platform sufficiently to be grasped by the operator and pulled out to the horizontal position.

In the positions of Figures 1, 5 and 6, the operator may place one foot after another upon the upper portions of the scraper bars 41 and move such foot back and forth over these bars so as to scrape any foreign matter which may be adherent to the soles of the shoes. Inasmuch as the bars 41 are spaced apart and that there is no bottom to the platform 12, and the cover 13 having automatically swung down out of the way, the removed foreign material will drop by gravity through the grill work constituted by the spaced scraper bars 41 upon the ground or road way beneath. The scraper bars 41 and the platform may be of such length from end wall 42 to end wall 43, that the brushes 49, 50 will engage the sides of soles of the shoe as the shoe is moved back and forth over the scraper blades 41 to the end that any foreign matter clinging to the sides of the soles or to the sides of the uppers may be removed by simultaneous brushing action.

In this way shoes of potential passengers may be cleaned a very short time before the passengers ascend into the vehicle. As soon as the scraping and brushing operation is concluded, the operator simply pushes the platform upwardly and inwardly of the frame and in so doing he automatically resets the release device or devices 17 and effects a latching of the platform in place. During this movement the cover will automatically seek the vertical position of Figure 3.

Although I have disclosed herein the best form of the invention known to me at this time, I reserve the right to all such modifications and changes as may come within the scope of the following claims.

What I claim is:

1. In a device of the kind described, a frame adapted to be let into the inside of the door of an automobile and to occupy a substantially upright position therein and having upper and lower portions, a shoe cleaning platform receivable in an upright position thereof in said frame and having upper and lower portions, the lower portion of the platform pivoted in the lower portion of said frame to swing out to a substantially horizontal position, said platform having slots therethrough to permit the scrapings to fall to the ground, scraper means on the platform spaced by the slots, a solid cover adapted to occupy a substantially upright position outwardly of the frame and platform in the upright positions of said frame and platform and having upper and lower portions, the upper portion of the cover pivoted to the upper portion of the platform to swing outwardly and downwardly with the platform and also to pivot with respect to the plaform to preserve the upright position of the cover in the horizontal position of the platform to thereby open the slots of the platform, and a cover stop on the platform located in the upright position of the platform to be engaged by the cover in its position outwards of the frame and platform.

2. The combination of claim 1, further comprising a cover weight on the lower portion of the cover biasing the cover at all times and in all positions to an upright attitude.

3. The combination of claim 1, further comprising platform ejection devices biased to an expanded position and located in the upper portion of the frame in position to be encountered and compressed by the upper portion of the platform in swinging upwardly into the frame, latch means in the upper portion of the frame located in the path of the platform to hold the platform normally closed in the frame against the ejecting action of the compressed ejection devices, and release means in the upper portion of the frame connected to said latch means and having a part exposed outwardly of the frame for triggering the latch means to release the platform to the action of the ejecting devices.

4. The combination of claim 1, further comprising elongated vertical strips of rubber attached to the frame in position to be encountered by the platform in its closing movement into the frame, said strips having shouldered portions, said platform having end bars received against said shouldered portions in the fully closed position of the platform in the frame.

References Cited in the file of this patent

UNITED STATES PATENTS

| | | |
|---|---|---|
| 932,514 | Thiel | Aug. 31, 1909 |
| 1,033,353 | Schultz | July 23, 1912 |
| 1,614,096 | Aste | Jan. 11, 1927 |
| 1,662,288 | Whitehead | Mar. 13, 1928 |
| 1,693,305 | MacDonald | Nov. 27, 1928 |
| 2,447,397 | Craig | Aug. 17, 1948 |
| 2,507,807 | Newbern | May 16, 1950 |
| 2,579,006 | Mims | Dec. 18, 1951 |
| 2,677,553 | Miller | May 4, 1954 |
| 2,665,921 | Schetzer | Jan. 12, 1954 |

FOREIGN PATENTS

| | | |
|---|---|---|
| 591,080 | Germany | Jan. 15, 1934 |
| 180,205 | Austria | Nov. 25, 1954 |